United States Patent [19]
Kim

[11] Patent Number: 5,807,208
[45] Date of Patent: Sep. 15, 1998

[54] HYDRAULIC CONTROL SYSTEM OF AN AUTOMATIC TRANSMISSION FOR A VEHICLE

[75] Inventor: Dong-Hyun Kim, Kimp'o, Rep. of Korea

[73] Assignee: Kia Motors Corporation, Seoul, Rep. of Korea

[21] Appl. No.: 704,066

[22] Filed: Aug. 28, 1996

[30] Foreign Application Priority Data

Jul. 11, 1996 [KR] Rep. of Korea ................... 1996-28006

[51] Int. Cl.⁶ .................................................. F16H 57/04
[52] U.S. Cl. ............................................ 477/161; 475/129
[58] Field of Search .............................. 477/161; 475/129

[56] References Cited

U.S. PATENT DOCUMENTS

| | | |
|---|---|---|
| 4,283,970 | 8/1981 | Vukovich ................................. 477/161 |
| 4,388,844 | 6/1983 | Arai et al. ............................... 477/161 |
| 5,074,167 | 12/1991 | Yoshimura et al. ..................... 477/161 |
| 5,086,668 | 2/1992 | Fijiwara et al. ......................... 477/161 |
| 5,347,886 | 9/1994 | Mainquist et al. ....................... 477/161 |

Primary Examiner—Dirk Wright

[57] ABSTRACT

A hydraulic control system of an automatic transmission. A pressure regulator valve of the hydraulic control system includes a pressure reducing valve for reducing oil pressure created in an oil pump to a predetermined level; a duty solenoid valve for creating a solenoid pressure by draining the oil reduced in the pressure reducing valve according to duty level of a transmission control unit based on open level of a throttle valve; and a pressure regulator valve for supplying the controlled oil to a manual valve acting in relation to a shift lever by controlling pressure of the oil supplied directly from the oil pump based on the reduction of the fluctuation in shock in the pressure accumulating valve.

8 Claims, 4 Drawing Sheets

HYDRAULIC CONTROL SYSTEM OF AN AUTOMATIC TRANSMISSION FOR A VEHICLE

FIELD OF INVENTION

This invention relates to a hydraulic control system of an automatic transmission for a vehicle, and more particularly, to a system of controlling the hydraulic pressure of transmission oil used in the automatic transmission during shifting.

PRIOR ART

In general, an automotive engine is designed to be mainly controlled in the elastic range of the engine which is the range from the rotary speed generating the maximum rotating power to the rotary speed generating the maximum output torque in the engine performance curve.

When going up a slope or incline, maximum tractive force or maximum torque of the drive wheels is required. However, as the acceleration ability and the climbing ability terribly decrease when the transmission ratio is below one. More specifically, when the rotary speed of the output power shaft is the same or higher than the rotary speed of the engine, planetary gear sets should be installed between the engine and the drive wheels to convert the power and the rotary speed of the engine to the level required for the drive wheels. In other words, the transmission acts to convert the torque and the rotary speed of the engine and transmit them to the drive wheels and to make the idle motion of the engine possible and convert the rotary direction of the drive wheels and the backward motion possible.

Such transmission is generally divided into a manual transmission and an automatic transmission. The manual transmission is designed such that the driver should operate a shift lever to make the shift condition suitable for the load condition and the speed of the vehicle. In contrast, the automatic transmission has no clutch control mechanism and is designed so that the driver operates only an acceleration pedal to increase or decrease the travelling speed.

Accordingly, the automatic transmission has the advantages that the driving is simple and convenient and shocks are not transferred to the engine or the drive mechanism. These merits have resulted in vehicles with the automatic transmission to be widespread.

The automatic transmission described shortly includes generally the fluid torque converter and planetary gear sets and is designed to be automatically speedy changed according to the drive condition and the load of the engine by means of the hydraulic control system.

The mechanism is simply described as follows. In general, the 4-speed automatic transmission includes a fluid torque converter connected to a crankshaft of an engine which functions a clutch and increasing a rotary torque; planetary gear sets installed next to the fluid torque converter and converting the rotary power and speed and if necessary converting the rotary direction; a hydraulic control system controlling a fluid pressure manually or automatically as complying the planetary gear sets with the vehicle speed or the drive condition; a housing enclosing the above elements; and a shift lever for selecting the mode such as parking, reverse and forward speed position.

The fluid torque converter includes three blades such as a pump impeller, a turbine runner, and a stator. The pump impeller is driven by a crankshaft of the engine. The turbine runner is installed in an input shaft of the transmission and the stator is installed through an one-way clutch in the housing. In the fluid torque converter the oil is filled.

The planetary gearsets each includes a sun gear, ring gear, a planetary carrier, friction elements for connecting or locking driving shafts or driven shafts. A clutch, a brake band, and an one-way clutch are used as the friction elements. The friction elements are operated by the hydraulic control system. They drive selectively the sun gear, the ring gear, and the planetary carrier or they otherwise connect or lock these parts to the driven shaft. Such operation makes the rotary speed and the rotary power transferred through the fluid torque converter to be increased and decreased and if necessary, to change rotational direction. The converted torque with rotary speed, rotary power, and direction is transferred to a final gear. The transfer operation according to the vehicle speed and the load condition is described in detail.

1. N Range (Neutral)

In this range, none of friction elements are operated. Planetary gear sets each comprising of a sun gear, a ring gear and a planetary carrier become idle. Therefore, the power of the input shaft is not transferred to the output shaft.

2. P Range (Parking)

The operation in this range is the same in function as in the above N range. However, as a shift lever is shifted into P range, the outside teeth of an oil distributor are inserted into a parking hole and the output shaft is thus mechanically locked. Furthermore, the low and reverse brake band is operated so that a rear planetary carrier is locked.

3. D Range (The First Forward Speed Range)

In this range, the first clutch and a one-way clutch is operated. Therefore, power is inputted to sun gear of the second planetary gear set. At this time, a ring gear is locked by the one-way clutch so that the power inputted into the sun gear is transmitted to the output shaft through planetary carrier with a reduction in speed.

4. D Range (The Second Forward Speed Range)

In this range, the first clutch and the first brake band are operated so that the power transferred to the sun gear of the second planetary gear set is transferred to the gear of the first planetary gear set through the planetary carrier as the ring gear is idle.

The power transferred in such path is transferred to the ring gear of the second planetary gear set through its planetary carrier with the predetermined reduction in speed as the sun gear of the first planetary gearset is locked by the first brake band. If taking into consideration the second planetary gear set, the power is inputted through both sun gear and ring gear of the second planetary gear set. The power inputted in such path is transferred to the output shaft through the planetary carrier. In this range, though this power is transferred with a reduction in speed, as the input power is transferred through both the sun gear and ring gear of the second planetary gear set, in this range the higher speed than in the first forward speed range is gained.

5. D Range (The Third Forward Speed Range)

In this range, the first clutch and the second clutch are operated. Therefore, the power is inputted to a planetary carrier of the first planetary gear set and sun gear of the second planetary gear set simultaneously. At this time, the power inputted into the planetary carrier are transferred to ring gear of the second planetary gear set through the planetary carrier of the second planetary gear set as the sun gear and ring gear thereof are idle state. As the power is inputted through the sun gear and the ring gear in a second planetary gear set in such process of transferring the power, the input power is transferred without any change in speed to the output shaft through the planetary carrier. Afterwards, planetary gear sets are connected to the output shaft and input power is transferred to the planetary carrier without any change in speed.

6. D Range (The Fourth Forward Speed Range)

In this range, the second clutch and the first brake band are operated. Therefore, the power is inputted to the planetary carrier of the first planetary gear set. At this time, the power is outputted through the ring gear with an increase in speed as the sun gear of this planetary gearset is locked by the first brake band. The power outputted through the ring gear of the first planetary gearset is transferred to the output shaft through the planetary carrier of the second planetary gearset. At this time, as the sun gear and ring gear of the second planetary gearset are idle, the power is passing through the first planetary gear set with an increase in speed. The power is then transferred to the output shaft. The overdrive condition is thus made.

7. R Range (Reverse)

In this range, the reverse clutch and the third brake are operated. The power is thus inputted to the sun gear of the first planetary gearset. At this time, the power inputted to the sun gear is outputted through the ring gear with a reverse in rotational direction and with a reduction in speed as the planetary carrier is locked by the second brake band, and the output power is transferred to the output shaft through the planetary carrier of the second planetary gear set. Therefore, the reverse underdrive is achieved.

As described above, the speed change made via the combination of each gear through each clutch and brake band is controlled by oil pressure created in a oil pump. An automatic transmissions include a control system for controlling an oil pressure according to travelling speed of the vehicle, engine load, and the position of the shift lever, and a transmission control units for electronically controlling the operation of the oil pressure control system.

The oil pressure control system includes a pressure control means for controlling the level of oil pressure created in the oil pump according to an engine load; a means for changing oil flow direction through the selective transfer of oil pressure into each element constituting the transmission units; and a pressure accumulating means for accumulating some portion of oil pressure so as to absorb shock of speed change.

Referring to FIG. 1, there is shown a pressure control means in a pressure control system of the conventional automatic transmission. A pressure reducing valve 2 and a pressure regulating valve 3 are parallel connected to an oil pump 1. The pressure reducing valve 2 is connected to a duty solenoid valve 4 for controlling the degree of opening of the valve to the duty valve of a transmission control unit. A pressure modifier valve 5, which regulates the oil pressure by defining a degree of opening of the valve by the duty solenoid valve 4, is connected to the duty solenoid valve 4. Also, an accumulating valve 6 for decreasing fluctuation of oil pressure regulated in the pressure modifier valve 5 is connected to the pressure modifier valve 5. The accumulating valve 6 is also connected to the pressure regulating valve 3, and the pressure regulating valve 3 is connected to a manual valve (not shown) which is one of distributors for supplying, selectively, oil by moving each gear in each speed range according to a shift lever.

The pressure regulating valve 3, as shown in FIG. 2, is comprised of a valve body 31; a sleeve 32 inserted into the inner circumference of the valve body 31; a valve 33 for opening and closing selectively an oil line by shifting the right or the lift due to a oil pressure with spline engagement with the sleeve 32; a stopper plug 34 inserted into one end of the sleeve 32, thus defining the movement of the valve 33, and a spring (not shown) inserted into the right side of the valve 33 due to a solenoid pressure such that the valve 33 moves more smoothly.

Therefore, oil pressure created in the oil pump 1 decreases in the pressure reducing valve 1 and the oil is supplied to the duty solenoid valve 4. The duty solenoid valve 4 controls a signal of a transmission control unit according to the open degree of a throttle valve, i.e., a drain level of oil pressure according to the level of the duty, thus creating solenoid pressure. The solenoid pressure act on the pressure modifier valve 5, and thus is properly regulated.

Such modified oil pressure becomes stable while passing the accumulating valve 6 for accumulating the fluctuation of oil. The stable oil pressure then acts on the pressure regulator valve 3, thus regulating to become optimum line pressure according to the degree of the opening of the throttle valve and various other conditions such as engine load and vehicle speed. The optimum line pressure is supplied to a manual valve.

The oil pressure supplied to the manual valve acts on each element of speed gear set, respectively according to the selected speed gear set, and the speed change is thus accomplished. Furthermore, the speed change is still in progress with the shock of speed change being relaxed due to the accumulating means.

However, the pressure regulating means of hydraulic system of conventional automatic transmission has many valves and, the oil pressure change at the change of speed, i.e., response of speed change is then slow as solenoid pressure is transmitted through the accumulating valve 6 after amended by the pressure modifier valve 5.

Moreover, as the number of the valves is many, the construction of the hydraulic control system is complicated and thus the control of the hydraulic system is difficult and its fabrication incurs a high cost.

Furthermore, as the pressure regulator valve 3 which finally controls line pressure supplied to the manual valve comprises sleeve 32 and stopper plug 34 as separate parts, respectively, oil leaks through gap between them and thus the loss of pressure incurs. For this reason, the loss of engine power is incurred.

SUMMARY

Accordingly, in view of the prior art described above, including the disadvantage and deficiencies of hydraulic system of prior art automatic transmissions, it is an object of the present invention to provide a hydraulic control system of an automatic transmissions which can enhance the response ability of speed change and which can incur the reduction of fabrication cost by decreasing the number of valves in a pressure control means.

Furthermore, it is another object of this invention to provide a hydraulic control system of an automatic transmissions which minimizes the loss of engine power by preventing the pressure loss due to the leakage of oil and in which a pressure regulating valve is simple in construction.

In order to overcome the above-mentioned problems in the conventional hydraulic control system of the automatic transmission, this invention includes a pressure control means for controlling the level of oil pressure created in the oil pump according to an engine load, a means for changing oil flow direction through the selective transfer of oil pressure regulated in the pressure control means into each element belonging to the transmission units, and a pressure accumulating means for accumulating some portion of oil pressure so as to absorb shock of speed change wherein the pressure control means comprises: a pressure reducing valve for reducing oil pressure created in oil pump to the predetermined level; a duty solenoid valve for creating a solenoid pressure by draining the oil reduced in the pressure reducing valve according to duty level of a transmission control unit based on open level of a throttle valve; an pressure accumulating valve for decreasing the fluctuation of solenoid pressure by draining the solenoid pressure created in the duty solenoid valve; and a pressure regulating valve for supplying the controlled oil to a manual valve acting in relation to a shift lever by controlling pressure of the oil supplied directly from the oil pump based on the reduction of the fluctuation in shock in the pressure accumulating valve.

Furthermore, the pressure regulating valve further comprises: a valve body having several oil paths; a sleeve inserted into the inner circumference of the valve body and at one end of which a stopper is formed integrally with it; a valve spline engaged with the sleeve to shift according to oil pressure; and a spring inserted into the other end of the valve to elastically support the valve in the direction of solenoid pressure.

Moreover, the sleeve formed integrally with the stopper may be the same material as the valve body. It is preferably aluminium.

According to the apparatus of the present invention, the response of speed change is enhanced and the construction thereof is simple. Thus fabrication cost is reduced. The pressure control means of hydraulic control system comprises a pressure reducing valve, a duty solenoid valve, an pressure accumulating valve and a pressure regulating valve as four elements. Thus, there is one less element present in the present invention than in the prior art. Moreover, the oil leakage can be prevented as the sleeve of the pressure regulating valve is formed integrally with the stopper thereof and thus a gap between them is eliminated.

BRIEF DESCRIPTION OF THE DRAWINGS

The advantages and embodiments of the present invention will be described in detail with reference to the following description, appended claims, and attached drawings wherein:

DETAILED DESCRIPTION OF THE PREFERRED EMBODIMENTS

This invention will be described by way of example with reference to the accompanying drawings.

In the present invention, the hydraulic control system generally includes a pressure regulating means for properly controlling oil pressure created in an oil pump; a means for changing the direction of oil flow to selectively supply oil pressure controlled in the pressure regulating means to the actuating element of selected speed gearset; and a pressure accumulating means for receiving some portion of oil supplied to the actuating element by the means for changing the direction of oil flow and thus for suppressing the shock of speed change.

Figure 1:
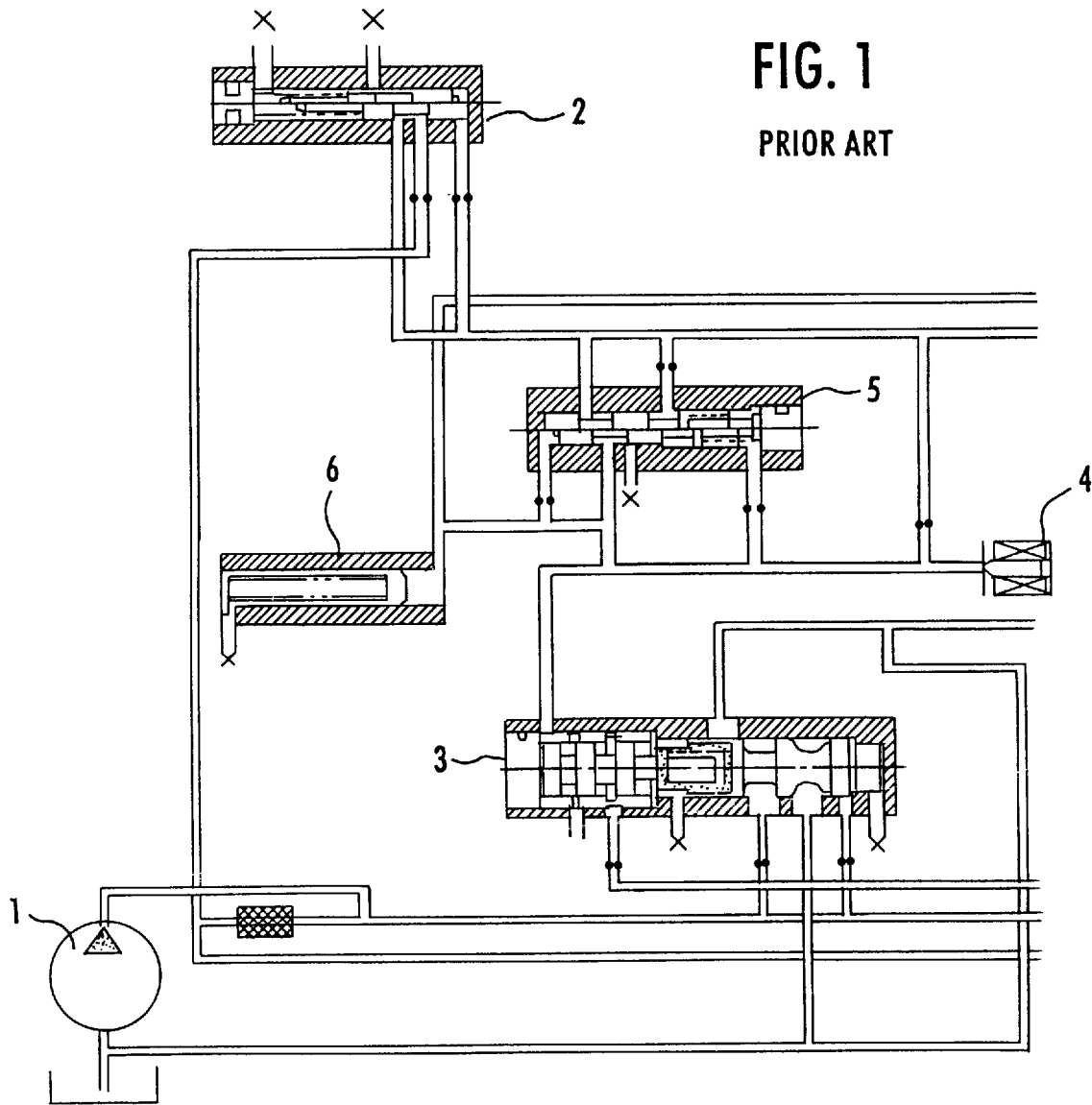
FIG. 1 shows a oil pressure circuit of a pressure control means in a hydraulic control system of the conventional automatic transmission.
Figure 2:
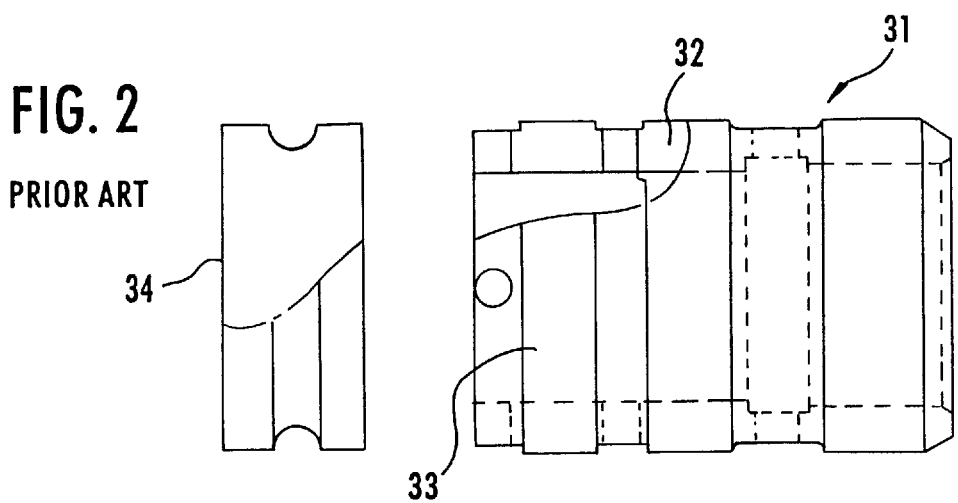
FIG. 2 shows the construction of a pressure regulating valve which is one of the constituting elements of the conventional pressure regulating means.
Figure 3:
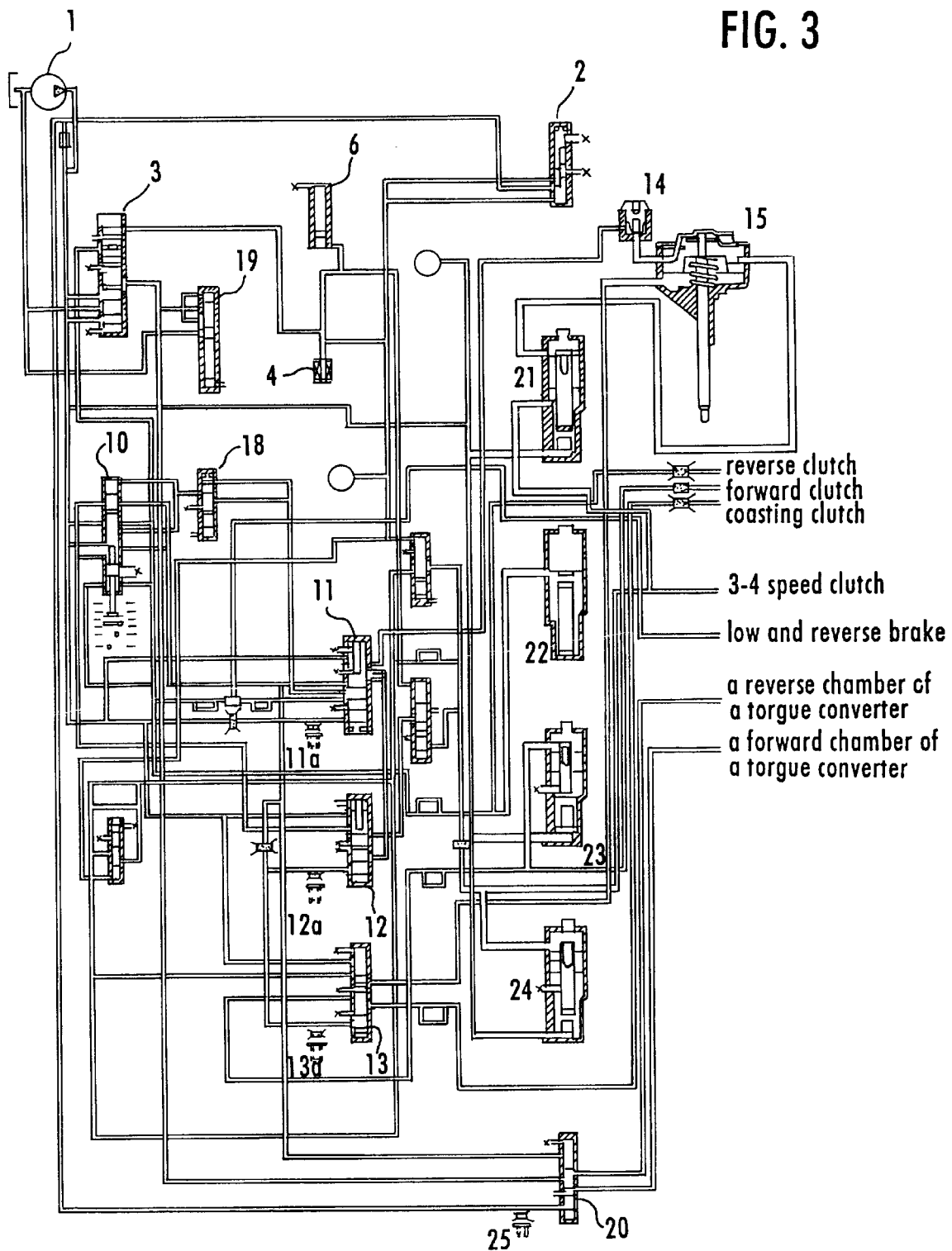
FIG. 3 is an oil pressure circuit showing the hydraulic control system of an automatic transmission according to an embodiment of the present invention.

The pressure regulating means is the primary and modified portion of this invention. It is shown in FIGS. 3 and 4, FIG. 4 shows the pressure regulating means in more detail than FIG. 3.

Figure 4:
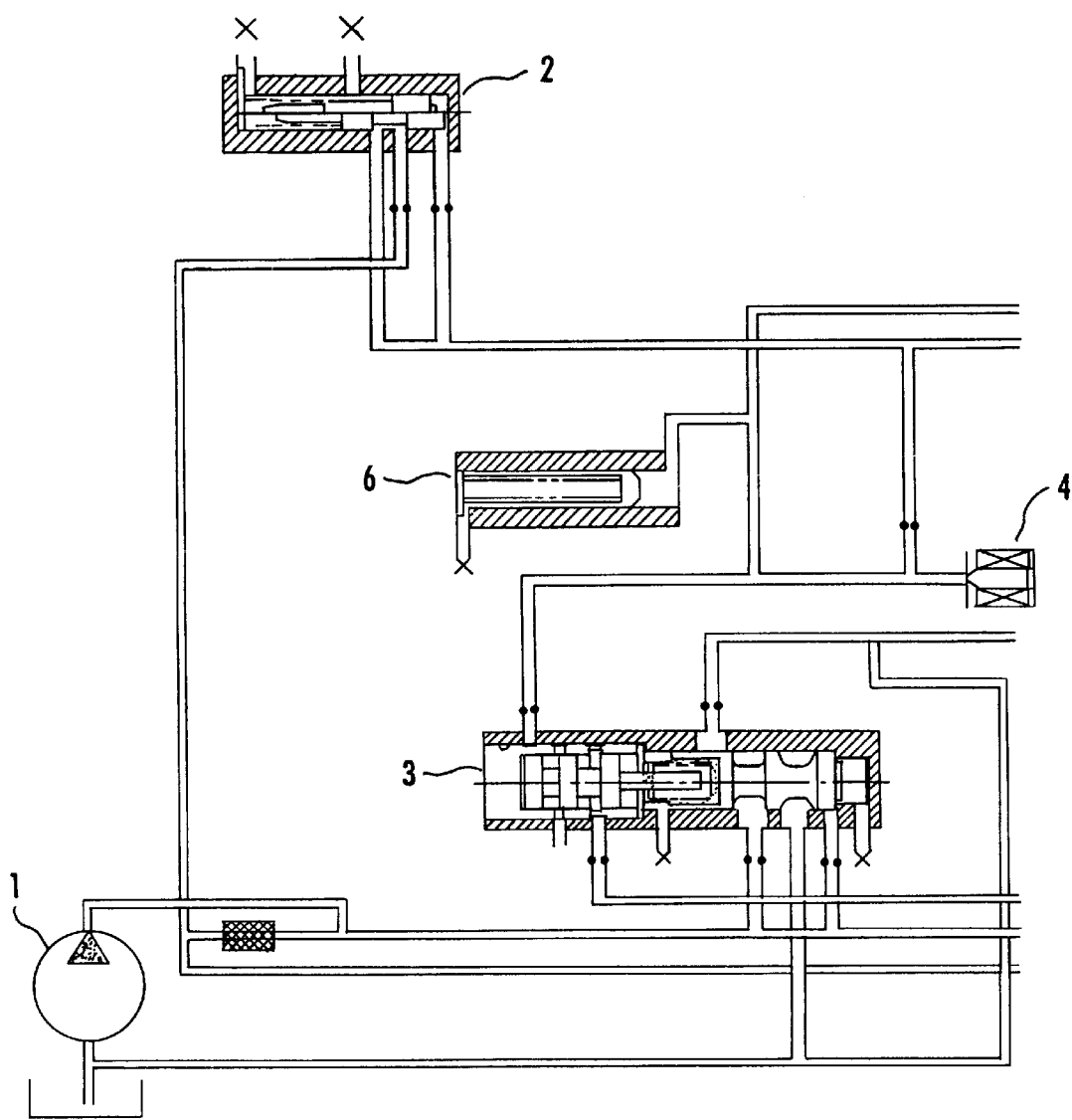
FIG. 4 is a large scaled hydraulic circuit of a pressure regulating means which is the modified portion in a hydraulic control system according to an embodiment of the present invention.

As shown in FIG. 4, a pressure reducing valve 2 for decreasing oil pressure to the constant pressure by draining some portion of oil is connected to an oil pump. A duty solenoid valve 4 for determining an open level according to duty level based on open level of a throttle valve and for creating solenoid pressure is connected to a pressure reducing valve 2. A accumulating valve 6 for receiving some of oil from the solenoid valve and thus for reducing fluctuation of oil is directly connected to a duty solenoid valve 4 without through a pressure modifier valve in different manner from conventional one. A pressure regulating valve 3 for controlling oil pressure finally created in an oil pump 1 is connected in parallel to a duty solenoid valve 4 and an accumulating valve 6 and directly connected to the oil pump 1.

Furthermore, a pressure regulating valve 3 is also connected to the back end of oil pump 1 via a line through which some portion of oil is by-passed.

Figure 5:
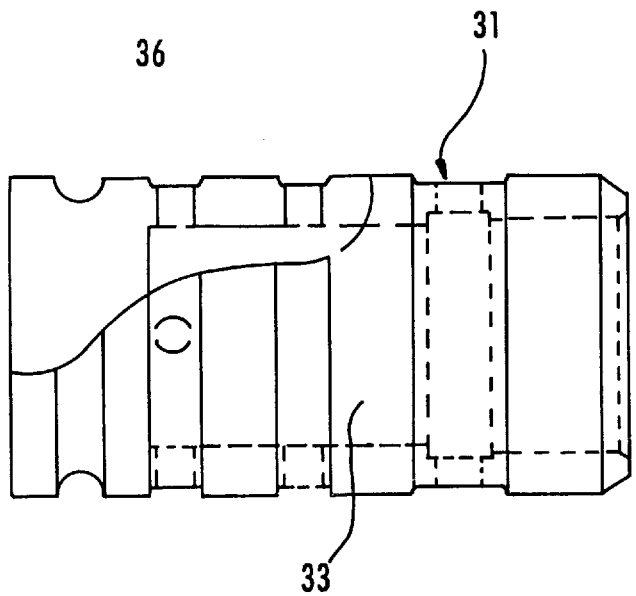
FIG. 5 shows the pressure regulating valve which is the main portion according to an embodiment of the present invention.
Figure 6:
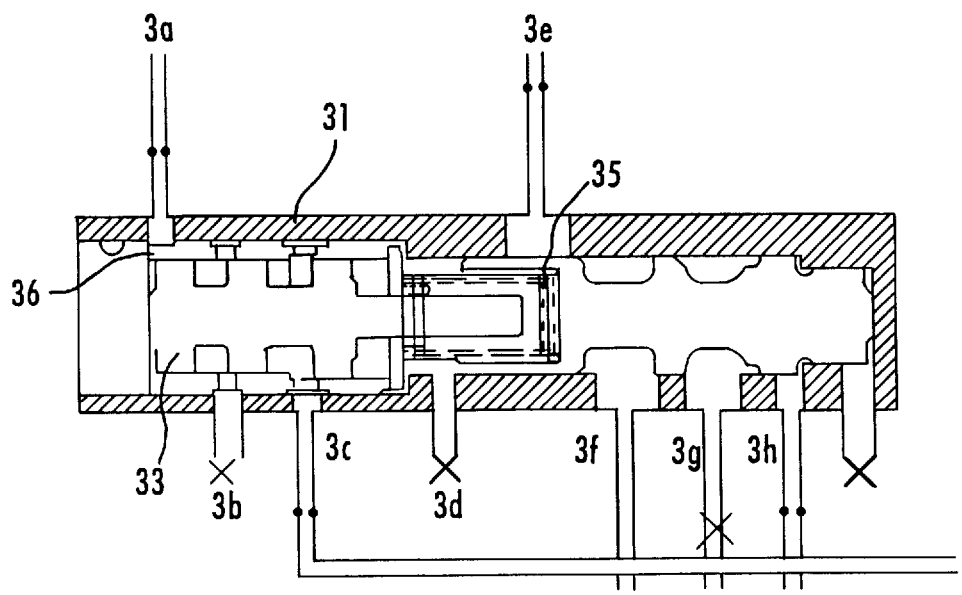
FIG. 6 is the explanation drawing showing operation of the pressure regulating valve according to an embodiment of the present invention.

Particularly, a pressure regulating valve 3 according to this invention, as shown in FIGS. 5 and 6, includes a valve body 31 having several oil paths; a sleeve 36 formed integrally with a stopper at one end thereof and inserted into the inner circumference of the valve body 31; a valve 33 spline engaged with the sleeve 36 and for opening or closing each oil path selectively with shift according to oil pressure; and a spring 35 inserted to the other end of the valve 33 and thus supporting elastically the valve 33 in the direction of solenoid pressure. That is to say, the pressure regulating valve 3 according to this invention comprises the stopper equipped sleeve 36 which is not formed as a separate element from the stopper but formed integrally with the stopper. The stopper equipped sleeve 36 is the same material as a valve body 31. It is preferably made of aluminium.

Now, referring to FIG. 3, a means for changing the direction of oil flow and an accumulating means according to this invention will be described.

A manual valve 10 for opening or closing the oil path of each speed gear set, i.e., each oil path of P, R, N, D, S and L ranges by shifting according to a shift lever is connected to a pressure regulating valve 3.

1-2 speed shift valve 11, 2-3 speed shift valve 12, and 3-4 speed shift valve 13 are connected a manual valve 10. The 1-2 speed shift valve 11 changes the direction of oil flow by determining the speed shift timing from 1 speed to 2 speed or from 2 speed to 1 speed and also controls the oil paths, respectively leading to low speed braking or reverse braking. 2-3 speed shift valve 12 changes the direction of oil flow by determining the speed shift timing from 2 speed to 3 speed or from 3 speed to 2. A 3-4 speeds shift valve 13 changes the direction of oil flow by determining the speed shift timing from 3 speed to 4 speed or from 4 speed to 3.

Shift valves 11, 12 and 13, respectively are connected to each other so that oil pressures of them acts on each other and the 1-2 shift valve 11 are connected to a servo piston valve 15 through a orifice valve 14 wherein the servo piston valve 15 acts to fasten of each brake band and acts as the accumulator for 4 speed clutch during the shift from 3 speed to 4 speed. Therefore, the servo piston valve 15 is connected to the 3-4 speed shift valve 13 and the oil pressure of the servo piston 15 acts on the 3-4 speed clutch through the accumulator 21 for 1-2 speed.

The shift valve for 2-3 speed is connected to the clutch for 3-4 speed through a by-pass valve 16 and a timing valve 17 for 2-3 speed, respectively, and the transmission shock becomes alleviated as the some portion of oil is received by the accumulator 24 for 2-3 speed. Furthermore, the shift valve 13 for 3-4 speed is connected a clutch for forward drive through an accumulator 23 for N-D range, and also connected to a coasting clutch which is used at the travelling in the neutral drive.

Moreover, solenoid valves 11a, 12a, and 13a for controlling the open level of each of shift valves 11, 12 and 13, respectively are equipped with each of shift valves 11, 12, and 13.

Furthermore, reverse clutch for R range is directly connected to the pressure regulating valve 3, and the accumulator 22 for N-R range is connected between them. A low pressure reducing valve 18 for decreasing oil pressure greatly at the low speed travelling is connected between a manual valve 10 and a 1-2 speed shift valve 11. Furthermore, an oil line which acts as a brake for low speed and reverse speed is connected in parallel to an oil line which connect the pressure regulating valve 3 and 1-2 speed shift valve 11.

Furthermore, a lock-up control valve 20 for controlling oil pressure from a pressure regulating valve 3 to a forward/backward chamber of a torque converter is directly connected to a pressure control valve 20 and a converter relief valve 19 for maintain oil pressure into a torque converter constant is equipped between them. Also, a lock-up control valve 20 is directly connected to the oil pump and a lock-up solenoid valve 25 is equipped between them.

Action of this embodiment that is constructed above will be described in detail.

The oil pressure created in the oil pump 1, as shown in FIG. 6, transfers directly not only the pressure regulating valve 3 through oil lines 3f and 3h and but also transfers a pressure reducing valve 2 and thus some of the oil pressure is drained to become reduced pressure. A solenoid pressure is then created by the duty solenoid valve 4 for drain the oil pressure based on the duty value according to the open level of the throttle valve and some of oil pressure again is drained by the accumulating valve 6 so that the fluctuation of oil decreases. The reduced oil pressure is transmitted to the pressure regulating valve 3 through the oil line 3a. At this time, oil pressure acting directly on oil lines 3f and 3h from the oil pump 1 is drained through oil line 3g and thus it matches the oil pressure acting on the oil line 3a. In this situation, when pushing an accelerator pedal in D range to increase the open level of the throttle valve, solenoid pressure is increased by the duty solenoid and thus push the valve 33 to the right closing the oil line 3g. Therefore, oil pressure acting on oil lines 3f and 3h is not drained through oil line 3g, and therefore, acts on the manual valve 10 without the decrease in pressure. The oil pressure acting on the manual valve 10 acts on the forward clutch or coasting clutch while some is accumulated by each one of accumulators 21, 23 and 24 via each one of shift valve 11, 12 and 13 based on the speed gearset selected by the manual valve 10.

Furthermore, oil pressure exiting through oil line 3e is controlled by the lock-up control valve 20 through a converter relief valve 19 and acts on chamber for forward drive or chamber for reverse drive.

Furthermore, at the change into R range, oil pressure acts on oil line 3c and the valve 33 thus shifts to the right closing oil line 3g. Therefore, large pressure acts on revere drive clutch and the vehicle thus moves backward.

According to this invention, the response time of the shift can be shortened as there is no conventional pressure modifier valve so that the solenoid pressure acts directly on the pressure regulator valve 3. Fabrication cost can be low because of the simplicity of the construction.

Furthermore, according to this invention, sleeve and stopper of the pressure regulating valve 3 are formed integrally as one element 36 to thus diminish the loss of pressure because of the decrease of oil leakage. Therefore, the loss of engine power can be kept to a minimum.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A hydraulic control system of an automatic transmission including a pressure control means for controlling an oil pressure created in an oil pump according to engine load, a means for changing a direction of oil flow by selectively supplying oil controlled in a pressure regulator to an actuating element of transferred change shift speed gearsets, and an accumulating means for preventing shift shock by accumulating some of oil supplied to the means for changing the direction of oil flow wherein said pressure control means comprises:

a pressure reducing valve for decreasing oil pressure created in the oil pump to a constant pressure;

a duty solenoid valve for creating a solenoid pressure by draining an oil pressure decreased in the pressure reducing valve based on a duty valve of a transmission control unit according to an open level;

an accumulating valve for decreasing fluctuation of solenoid pressure by draining some of solenoid pressure created in the duty solenoid valve; and a pressure regulating valve for supplying the constant pressure to a manual valve actuating in combination with a shift lever.

2. The hydraulic control system of an automatic transmission as claimed in claim 1 wherein said pressure regulating valve includes a valve body having several oil paths; a sleeve formed integrally with a stopper at a first end thereof and inserted into an inner circumference of the valve body; a valve spline engaged with the sleeve and for opening or closing each oil path selectively with shift according to oil pressure; and a spring inserted to a second end of the valve for supporting elastically the valve in a direction of the solenoid pressure.

3. The hydraulic control system of an automatic transmission as claimed in claim 2 wherein the sleeve and the valve body are made from a like material.

4. The hydraulic control system of an automatic transmission as claimed in claim 3 wherein the sleeve and the valve body are composed of aluminum.

5. An oil pressure control system for controlling an oil pressure created in an oil pump according to engine load for a hydraulic control system for an automatic transmission, said oil pressure control system comprising:

- a pressure reducing valve for decreasing oil pressure created in the oil pump to a constant pressure,
- a duty solenoid valve for creating a solenoid pressure by draining the constant pressure created in the pressure reducing valve based on a duty valve of a transmission control unit according to an open level,
- an accumulating valve for decreasing fluctuation of solenoid pressure by draining part of the solenoid pressure created in the duty solenoid valve, and
- a pressure regulating valve for supplying the constant pressure to a manual valve actuating in combination with a shift lever.

6. The oil pressure control system according to claim 5 wherein said pressure regulating valve comprises:

- a valve body having several oil paths;
- a sleeve formed integrally with a stopper at a first end thereof and inserted into an inner circumference of the valve body;
- a valve spline engaged with the sleeve and for opening or closing each oil path selectively with shift according to oil pressure; and
- a spring inserted to a second end of the valve for supporting elastically the valve in a direction of the solenoid pressure.

7. The oil pressure control system according to claim 6 wherein the sleeve and the valve body are made from a like material.

8. The oil pressure control system according to claim 7 wherein the sleeve and the valve body are composed of aluminum.

* * * * *